(12) United States Patent
Sato et al.

(10) Patent No.: US 10,309,457 B2
(45) Date of Patent: Jun. 4, 2019

(54) SLIDING MEMBER

(71) Applicant: Senju Metal Industry Co., Ltd., Tokyo (JP)

(72) Inventors: Naoki Sato, Tochigi (JP); Ryoichi Kurata, Tochigi (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 14/388,016

(22) PCT Filed: Mar. 4, 2013

(86) PCT No.: PCT/JP2013/055816
§ 371 (c)(1),
(2) Date: Sep. 25, 2014

(87) PCT Pub. No.: WO2013/146108
PCT Pub. Date: Oct. 3, 2013

(65) Prior Publication Data
US 2015/0049966 A1    Feb. 19, 2015

(30) Foreign Application Priority Data

Mar. 27, 2012 (JP) ................................. 2012-071568

(51) Int. Cl.
*F16C 33/12* (2006.01)
*F16C 33/14* (2006.01)
(Continued)

(52) U.S. Cl.
CPC ............ *F16C 33/12* (2013.01); *F04B 1/2021* (2013.01); *F04B 1/2028* (2013.01); *F16C 33/14* (2013.01);
(Continued)

(58) Field of Classification Search
CPC .............. F16C 2240/54; F16C 2202/04; F16C 2202/10–18; F16C 33/10; F16C 33/12;
(Continued)

(56) References Cited

U.S. PATENT DOCUMENTS 5,041,339 A     8/1991 Mori et al.
5,337,872 A *   8/1994 Kawamura et al. ..... 192/107 M
(Continued)

FOREIGN PATENT DOCUMENTS

CN     1497147     5/2004
CN     1242480     2/2006
(Continued)

OTHER PUBLICATIONS

Machine Translation of JP H07-167041 (Year: 1995).*
(Continued)

*Primary Examiner* — Alan B Waits
(74) *Attorney, Agent, or Firm* — Chernoff, Vilhauer, McClung & Stenzel, LLP

(57) ABSTRACT

To provide a sliding member which has hardness that is suitable for the circumstance, to which heavy load is applied, and which is excellent in abrasion resistance property.
The sliding member contains a sliding layer for slidably supporting a body to be slid, shot blasting being performed on a surface of the sliding layer, and a sliding surface formed on a surface of the sliding layer, the sliding surface having an uneven configuration with arithmetic mean roughness (Ra) of 1.0 μm through 2.5 μm, 10-point average roughness (Rz) of 5.0 μm through 10.0 μm, and surface hardness (Hv) of 220 through 250.

3 Claims, 18 Drawing Sheets

(51) Int. Cl.
*F16C 33/20* (2006.01)
*F16C 17/04* (2006.01)
*F04B 1/20* (2006.01)
*F01B 3/00* (2006.01)
*F16C 33/10* (2006.01)

(52) U.S. Cl.
CPC ............ *F16C 33/20* (2013.01); *F01B 3/0073* (2013.01); *F16C 17/04* (2013.01); *F16C 33/10* (2013.01); *F16C 2202/04* (2013.01); *F16C 2204/10* (2013.01); *F16C 2204/12* (2013.01); *F16C 2223/08* (2013.01); *F16C 2240/40* (2013.01); *F16C 2240/48* (2013.01); *F16C 2240/54* (2013.01); *F16C 2360/00* (2013.01)

(58) Field of Classification Search
CPC ...... F16C 33/14; F16C 33/20; F16C 2204/10; F16C 2204/12; F16C 2223/08; F16C 2240/40; F16C 17/04; F16C 2360/00; F04B 1/2021; F04B 1/2028
See application file for complete search history.

(56) References Cited

U.S. PATENT DOCUMENTS

| | | | |
|---|---|---|---|
| 5,592,840 A | | 1/1997 | Miyasaka |
| 5,885,375 A | * | 3/1999 | Takemura ............... C22C 14/00 148/421 |
| 5,958,522 A | | 9/1999 | Nakagawa |
| 6,015,775 A | | 1/2000 | Takayama |
| 6,245,836 B1 | * | 6/2001 | Nakamaru et al. .......... 523/428 |
| 6,294,029 B1 | | 9/2001 | Sakate et al. |
| 6,523,456 B1 | * | 2/2003 | Kobayashi et al. ............ 92/158 |
| 6,770,381 B2 | * | 8/2004 | Kanayama et al. .......... 428/626 |
| 7,541,086 B2 | * | 6/2009 | Gartner ................. F16C 33/201 384/276 |
| 7,662,472 B2 | | 2/2010 | Tanaka |
| 7,833,609 B2 | * | 11/2010 | Fujita et al. .................. 428/174 |
| 8,017,668 B2 | * | 9/2011 | Tanaka et al. ................ 523/149 |
| 8,252,733 B2 | * | 8/2012 | Tanizawa et al. ........... 508/103 |
| 9,303,230 B2 | | 4/2016 | Tomikawa et al. |
| 10,145,415 B2 | | 12/2018 | Sato |
| 2003/0064239 A1 | | 4/2003 | Saitou et al. |
| 2003/0209103 A1 | | 11/2003 | Takayama |
| 2007/0009757 A1 | | 1/2007 | Takayama |
| 2007/0031651 A1 | * | 2/2007 | Kagohara et al. ........... 428/323 |
| 2009/0004030 A1 | | 1/2009 | Sugioka |
| 2009/0305917 A1 | | 12/2009 | Tanizawa et al. |
| 2009/0311476 A1 | * | 12/2009 | Stetina ..................... B05D 5/08 428/141 |
| 2010/0052262 A1 | * | 3/2010 | Ishida .................. F16C 41/007 277/349 |
| 2011/0044572 A1 | * | 2/2011 | Kano et al. ......... C23C 16/0281 384/625 |
| 2013/0216169 A1 | * | 8/2013 | Zidar ....................... C22C 9/00 384/276 |
| 2014/0303050 A1 | * | 10/2014 | Tomikawa et al. ........... 508/108 |
| 2015/0049966 A1 | | 2/2015 | Sato |
| 2015/0273584 A1 | | 10/2015 | Masuda |

FOREIGN PATENT DOCUMENTS

| | | |
|---|---|---|
| CN | 101400453 | 4/2009 |
| DE | 102010053338 A1 | 6/2012 |
| GB | 2273747 A | 6/1994 |
| GB | 2285265 A | 7/1995 |
| JP | 59-075914 A | 4/1984 |
| JP | 59-126753 A | 7/1984 |
| JP | 62-030851 A | 2/1987 |
| JP | 02-066106 A | 3/1990 |
| JP | 07-190065 A | 7/1995 |
| JP | 07167041 A * | 7/1995 |
| JP | H07243308 | 9/1995 |
| JP | 08-120370 A | 5/1996 |
| JP | 09-049006 A | 2/1997 |
| JP | 10-267033 A | 10/1998 |
| JP | 2000-303161 A | 10/2000 |
| JP | 2000303161 | 10/2000 |
| JP | 2000 320555 | 11/2000 |
| JP | 2000320555 | 11/2000 |
| JP | 2001-294904 A | 10/2001 |
| JP | 2004-360731 A | 12/2004 |
| JP | 2006 070811 | 3/2006 |
| JP | 200670811 | 3/2006 |
| JP | 0004848821 | 1/2007 |
| JP | 2007284706 | 1/2007 |
| JP | 2007-284706 A | 11/2007 |
| JP | 2008 164097 | 7/2008 |
| TW | 201213052 A | 4/2012 |
| WO | 2011/127513 | 10/2011 |
| WO | 2013039177 A1 | 3/2013 |
| WO | 2013146108 A1 | 10/2013 |

OTHER PUBLICATIONS

Japanese Patent Office, Administrative Official Takaaki Seino, "Decision to Grant a Patent" issued in re Japanese patent application No. 201-516873, May 28, 2013.
Office Action from corresponding Chinese patent application No. 201380016371.2 dated Apr. 16, 2015, 5 pgs.
English translation of Office Action from corresponding Chinese patent application No. 201380016371.2, dated Apr. 16, 2015, 5 pgs.
Office Action prepared by the USPTO for U.S. Appl. No. 14/437,411 (Pub No. 2015-0273584); dated Aug. 29, 2016, 68 pages.
Office Action prepared by the USPTO for U.S. Appl. No. 14/437,411 (Pub No. 2015-0273584); dated Mar. 28, 2016, 8 pages.
Response to Office Action prepared by the USPTO for U.S. Appl. No. 14/437,411 (Pub No. 2015-0273584); filed May 10, 2016, 6 pages.
International Search Report from PCT Application No. PCT/JP2013/078581, dated Dec. 10, 2013, 4 pages.
Extended European Search Report from the European Patent Office for EP 13849924.9, dated Sep. 9, 2015, 7 pages.
Office Action from the Taiwan Intellectual Property Office for TW 102138396, dated Nov. 2, 2015, 8 pages.
US Patent and Trademark Office, Office Action for U.S. Appl. No. 15/024,595, dated Jul. 15, 2016, 11 pages.
US Patent and Trademark Office, Final Office Action for U.S. Appl. No. 15/024,595, dated Dec. 16, 2016, 9 pages.
US Patent and Trademark Office, Office Action for U.S. Appl. No. 15/024,595, dated Nov. 30, 2017, 10 pages.
United States Patent and Trademark Office; Final Office Action dated Mar. 21, 2018 for U.S. Appl. No. 15/024,595 filed Mar. 24, 2016; 11 pages.
US Patent and Trademark Office, Applicant-Initiated Interview Summary for U.S. Appl. No. 15/024,618, dated Jun. 8, 2018, 1 page.
Naoki Sato et al., Amendment Accompanying Request for Continued Examination for U.S. Appl. No. 15/024,618, dated Jul. 30, 2018, 9 pages.
US Patent and Trademark Office; Notice of Allowability for U.S. Appl. No. 15/024,618, dated Aug. 15, 2018, 5 pages.

* cited by examiner

【FIG. 1】
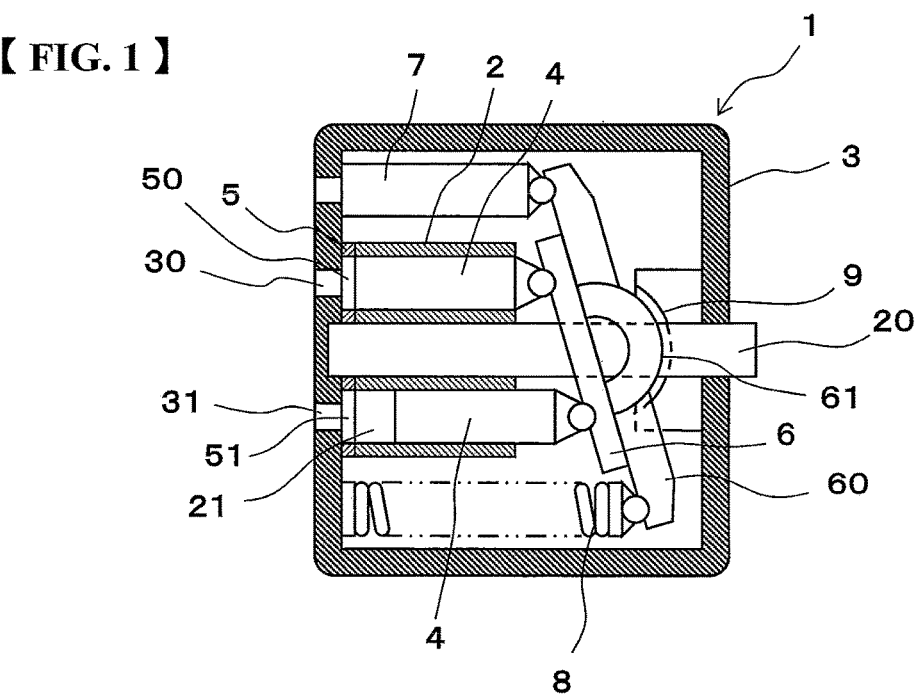
【FIG. 2A】
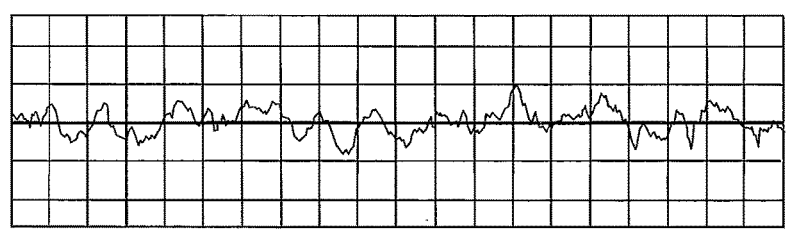

【FIG. 2B】
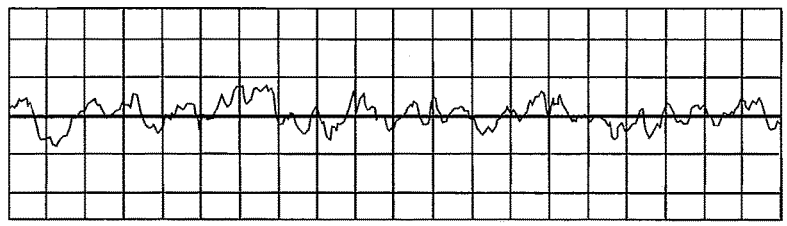
【FIG. 2C】
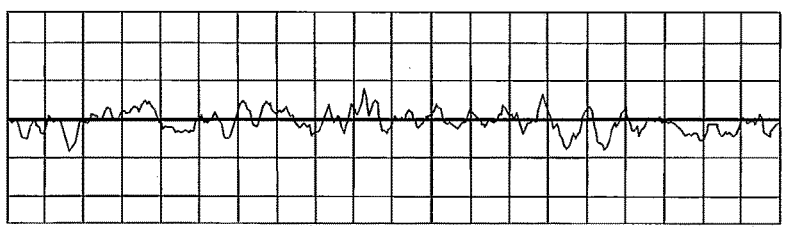
【FIG. 3A】
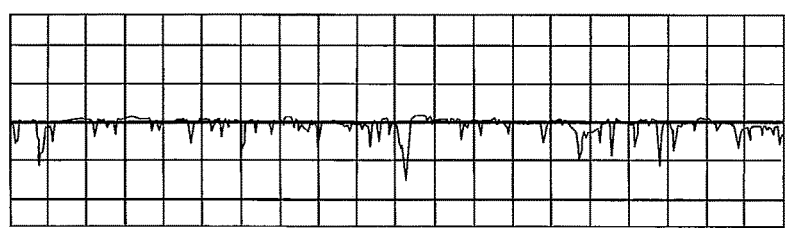

【 FIG. 3B 】
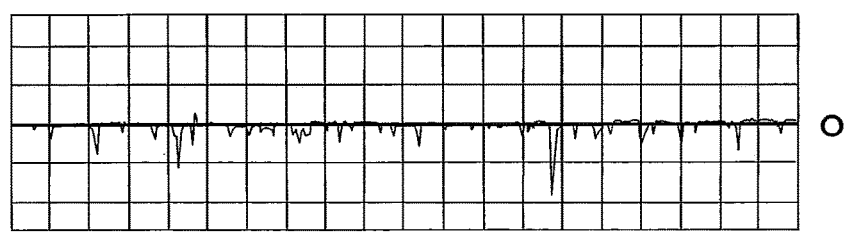
【 FIG. 3C 】
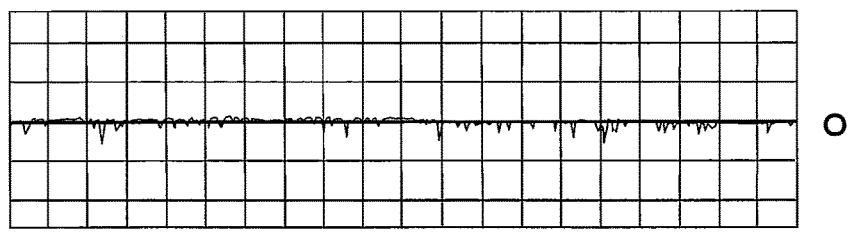
【 FIG. 4A 】
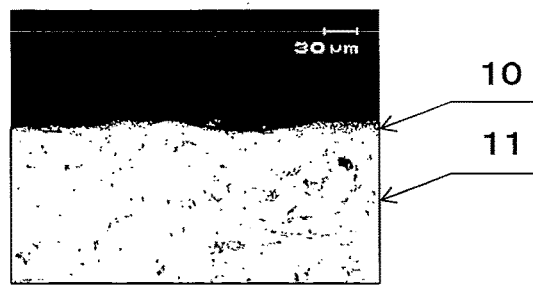

【 FIG. 4B 】
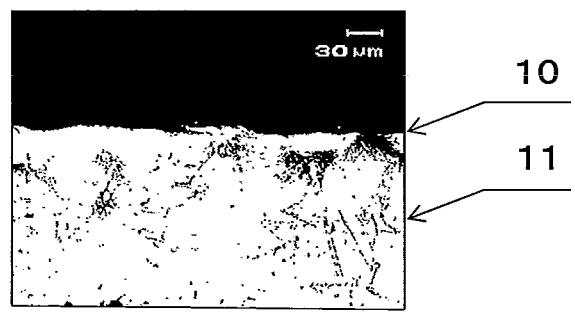
【 FIG. 4C 】
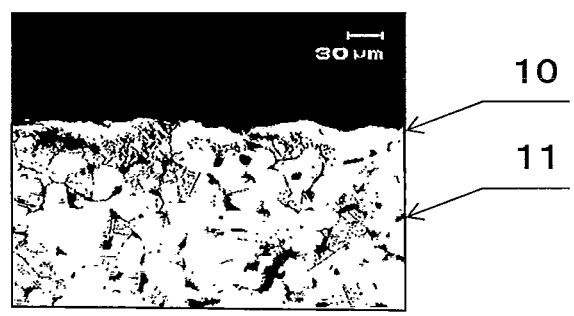

【FIG. 5A】
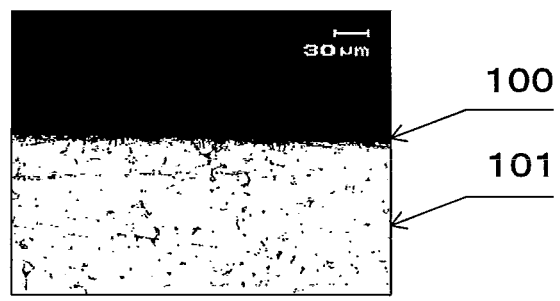
【FIG. 5B】
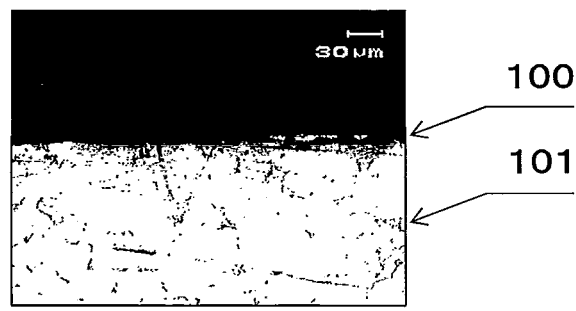

[ FIG. 5C ]
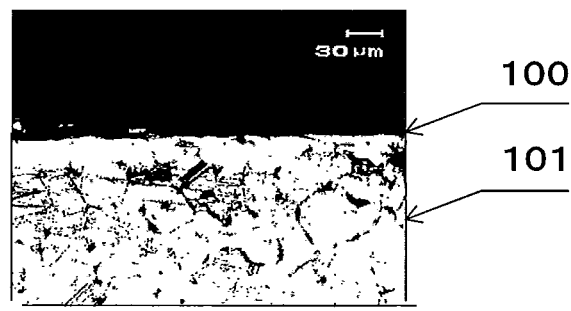
[ FIG. 6A ]
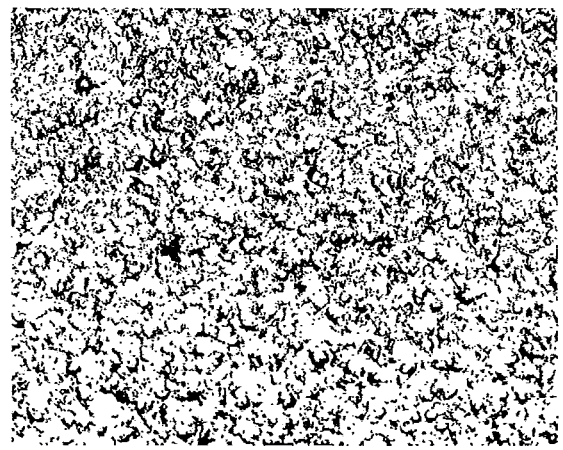

【 FIG. 6B 】
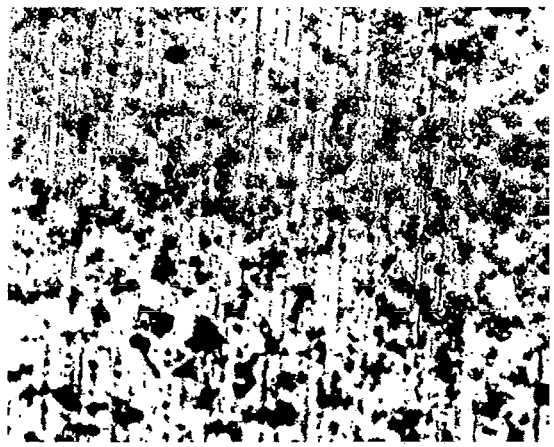
【 FIG. 7A 】
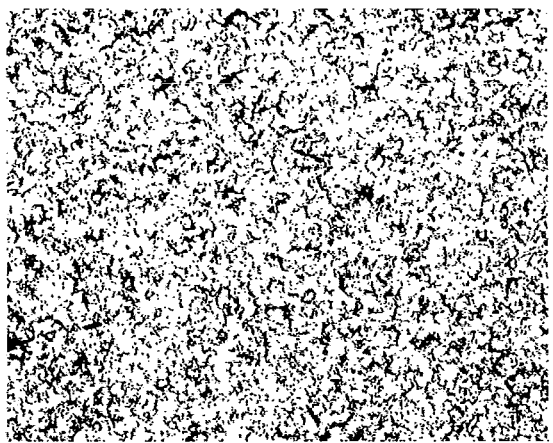

【 FIG. 7B 】
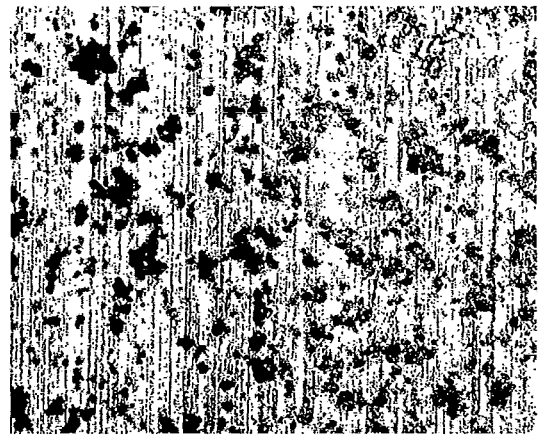
【 FIG. 8A 】
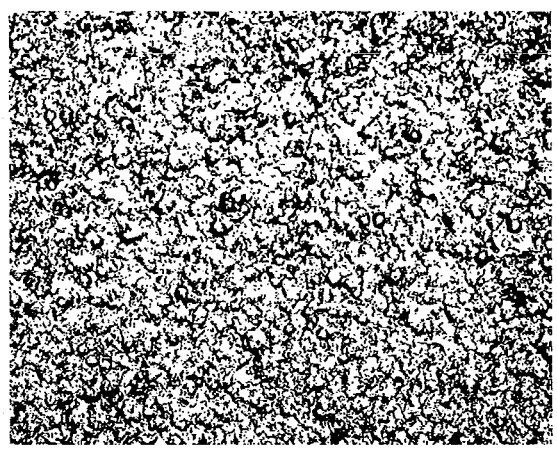

【 FIG. 8B 】
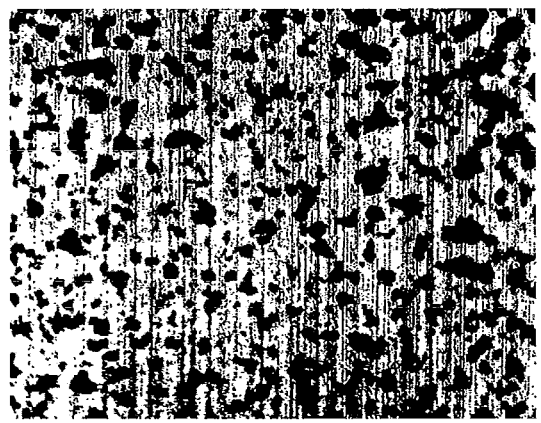
【 FIG. 9A 】
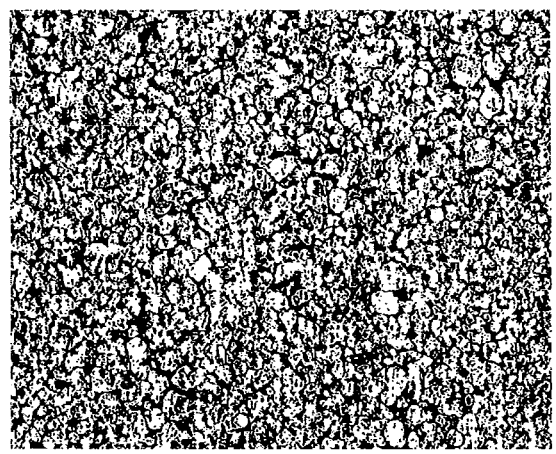

【 FIG. 9B 】
【 FIG. 10A】

【FIG. 10B】
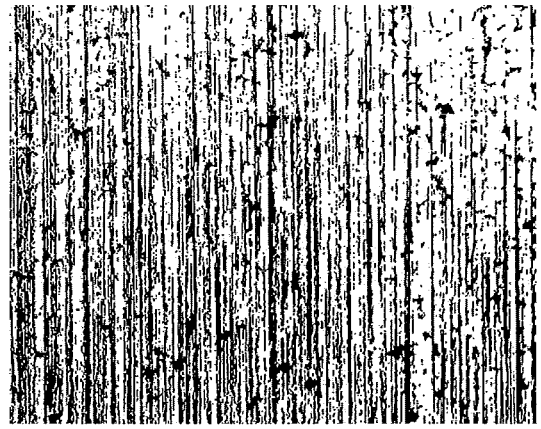
【FIG. 11A】
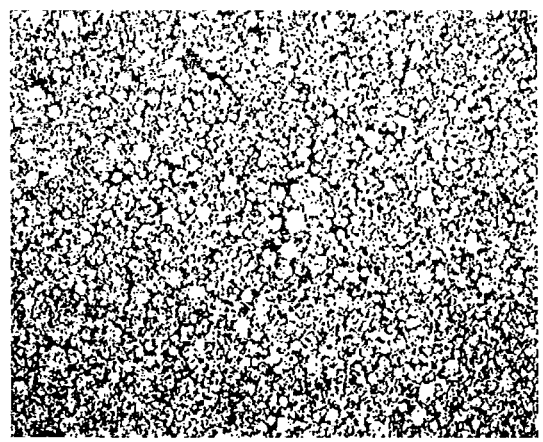

[ FIG. 11B ]
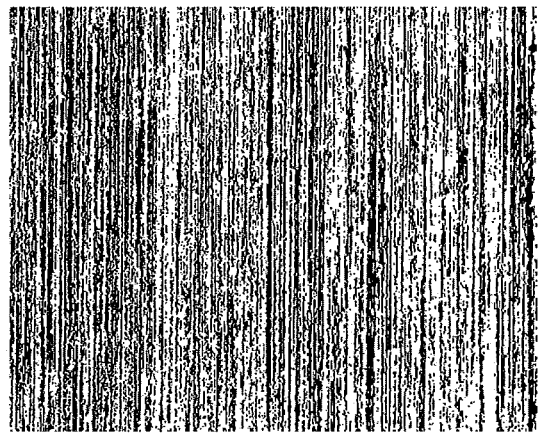
[ FIG. 12A ]
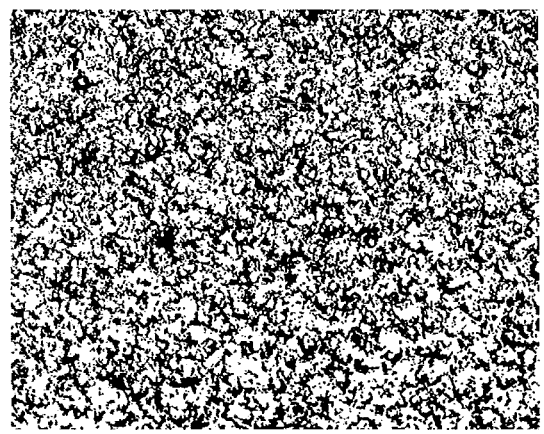

【 FIG. 12B 】
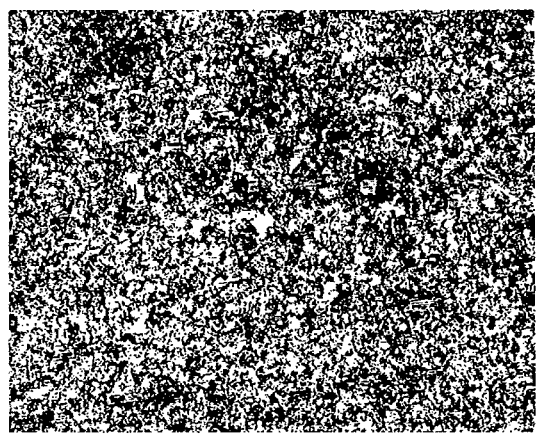
【 FIG. 13A 】
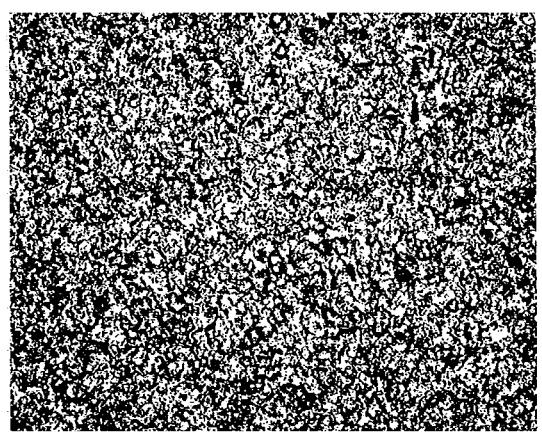

【 FIG. 13B 】
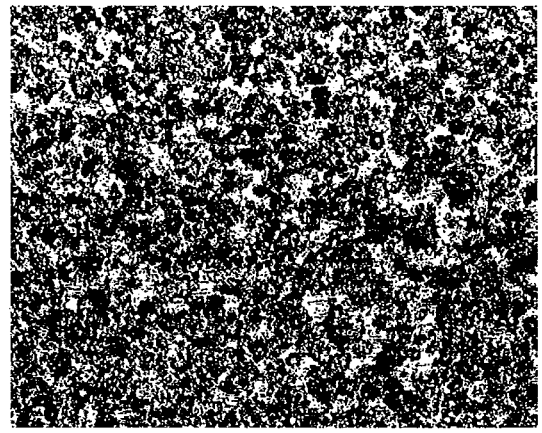
【 FIG. 14A】
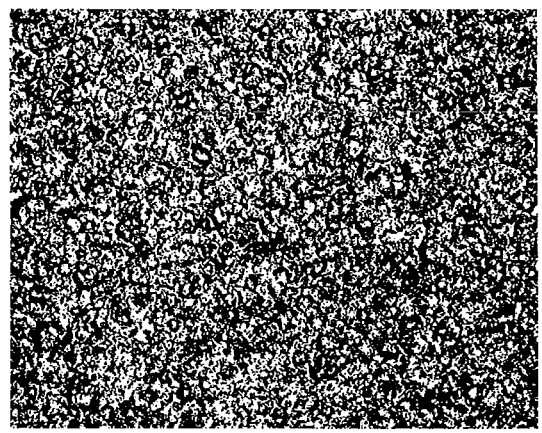

【 FIG. 14B 】
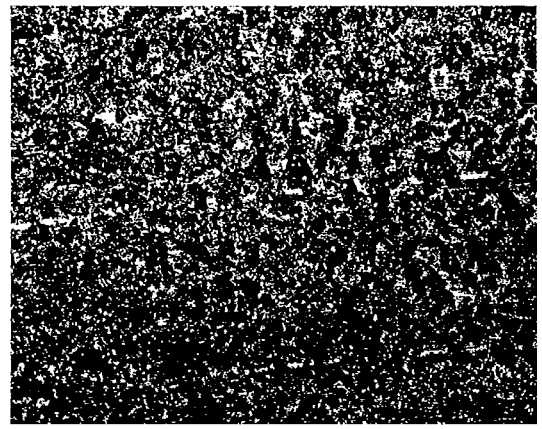
【 FIG. 15A 】
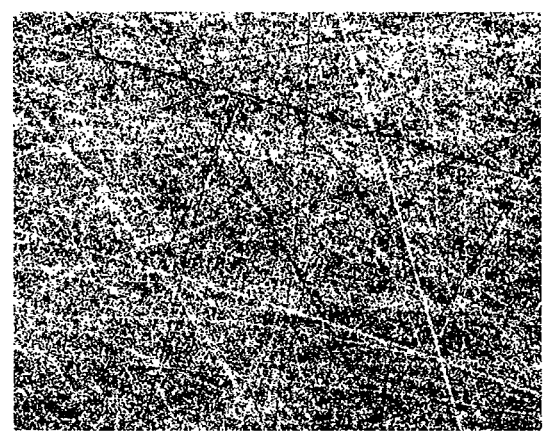

【FIG. 15B】
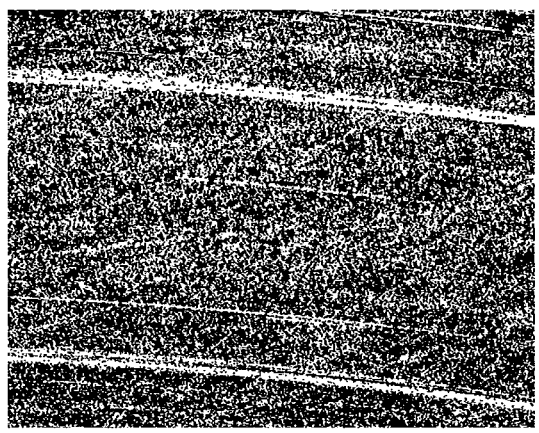
【FIG. 16A】
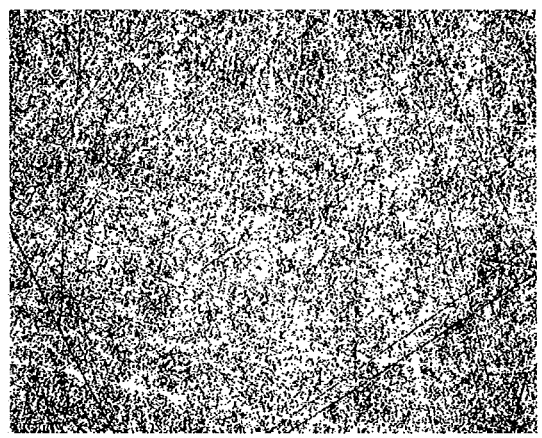

[FIG. 16B]
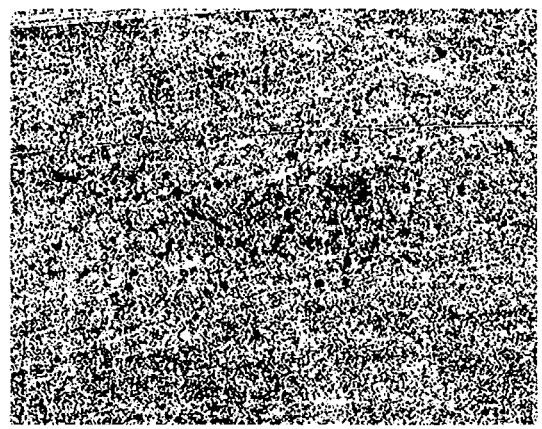
[FIG. 17A]
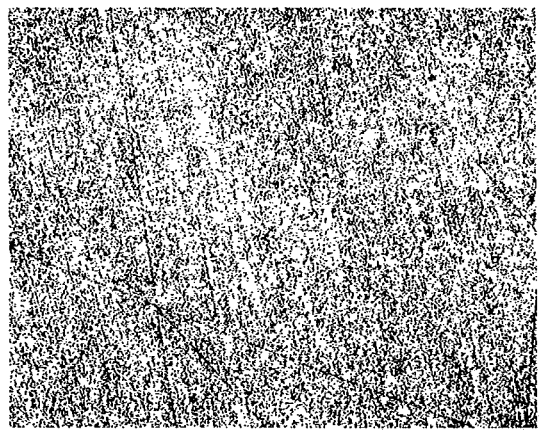

【FIG. 17B】

SLIDING MEMBER

TECHNICAL FIELD

The present invention relates to a sliding member that slidably supports a body to be slid.

BACKGROUND OF THE INVENTION

In general, it is desirable that a sliding surface is a smooth surface in order to reduce friction in the sliding surface. When, however, the sliding surface becomes smooth, frictional resistance is limited to a low one. On the other hand, heat occurs in some degree at the sliding surface so that there is a risk of a generation of adhesion by so-called seizing. Accordingly, the sliding surface is required to have any suitable surface roughness.

In the past, a shot blasting against the sliding surface to form any recesses thereon has been a well-known technology. A technology to form an oil reservoir on a sliding surface of the sliding member by shot blasting has been known (see, for example, the patent document 1).

DOCUMENTS FOR PRIOR ART

Patent Documents

Patent Document 1: Japanese Patent No. 4848821.

SUMMARY OF THE INVENTION

Problems to be Solved by the Invention

By performing the shot blasting on the sliding surface thereof to form the oil reservoir on the sliding surface, it is possible to accomplish a low coefficient of friction and to have a good sliding performance. However, under a circumstance in which a heavy load is applied in an oil machine or the like, the sliding surface may not maintain its uneven configuration formed by the shot blasting according to a hardness of the sliding surface so that a desirable sliding performance cannot be maintained.

The present invention has an object to provide a sliding member which has a hardness that is suitable for a circumstance to which heavy load is applied and has an excellent abrasion resistance property.

Means for Solving the Problems

By focusing on that a surface hardness of a body on which the shot blasting has been performed has been improved, the inventors have found out a combination of the hardness that is suitable for the circumference to which heavy load is applied and the surface roughness, in which the oil reservoir can be formed, that is suitable for the abrasion resistance property or the like.

The invention relates to a sliding member containing a sliding layer for slidably supporting a body to be slid, shot blasting being performed on a surface of the sliding layer, and a sliding surface formed on a surface of the sliding layer, which has an uneven configuration with arithmetic mean roughness (Ra) of 1.0 μm through 2.5 μm, 10-point average roughness (Rz) of 5.0 μm through 10.0 μm, and surface hardness (Hv) of 220 through 250.

It is preferable that the shot blasting is performed using blasting material composed of steel-based metallic material at a blasting distance of not less than 50 mm and not more than 150 mm for a period of blasting time of not less than 5 seconds and not more than 30 seconds. The blasting material has a spherical shape with a particle size of 180 μm through 300 μm and surface hardness (Hv) of 280 through 600.

Moreover, it is preferable that the sliding layer is composed of copper alloy having the surface hardness (Hv) of 80 through 150 before the shot blasting is performed.

Effects of the Invention

By the sliding member according to this invention, since a sliding surface has arithmetic mean roughness (Ra) of 1.0 μm through 2.5 μm and 10-point average roughness (Rz) of 5.0 μm through 10.0 μm, an oil reservoir is formed on the sliding surface. Since the sliding surface also has surface hardness (Hv) of 220 through 250, the uneven configuration on the sliding surface can be maintained even under a circumstance to which heavy load is applied.

Accordingly, it is possible to obtain a high hardness property that is suitable for the circumstance to which heavy load is applied. Since this invention is excellent in cavitation erosion resistance property in a field such as an oil machine while maintaining the abrasion resistance property, it has an effect of inhibiting the sliding member from being adhered and eroded.

BRIEF DESCRIPTION OF THE DRAWINGS

FIG. 1 is a diagram showing a configuration example of a piston pump to which a sliding member according to a subject embodiment is applied.

FIG. 2A is a graph showing a form of surface roughness of a sliding surface in each embodiment.

FIG. 2B is a graph showing a form of surface roughness of a sliding surface in each embodiment.

FIG. 2C is a graph showing a form of surface roughness of a sliding surface in each embodiment.

FIG. 3A is a graph showing a form of surface roughness of a sliding surface in each comparison example.

FIG. 3B is a graph showing a form of surface roughness of a sliding surface in each comparison example.

FIG. 3C is a graph showing a form of surface roughness of a sliding surface in each comparison example.

FIG. 4A is a micrograph of the sliding surface in each embodiment.

FIG. 4B is a micrograph of the sliding surface in each embodiment.

FIG. 4C is a micrograph of the sliding surface in each embodiment.

FIG. 5A is a micrograph of the sliding surface in each comparison example.

FIG. 5B is a micrograph of the sliding surface in each comparison example.

FIG. 5C is a micrograph of the sliding surface in each comparison example.

FIG. 6A is a micrograph before and after a test of the sliding surface of a half bearing of an embodiment 1.

FIG. 6B is a micrograph before and after the test of the sliding surface of the half bearing of the embodiment 1.

FIG. 7A is a micrograph before and after a test of the sliding surface of a half bearing of an embodiment 2.

FIG. 7B is a micrograph before and after the test of the sliding surface of the half bearing of the embodiment 2.

FIG. 8A is a micrograph before and after a test of the sliding surface of a half bearing of an embodiment 3.

FIG. 8B is a micrograph before and after the test of the sliding surface of a half bearing of the embodiment 3.

FIG. 9A is a micrograph before and after a test of the sliding surface of a half bearing of a comparison example 1.

FIG. 9B is a micrograph before and after the test of the sliding surface of the half bearing of the comparison example 1.

FIG. 10A is a micrograph before and after a test of the sliding surface of a half bearing of a comparison example 2.

FIG. 10B is a micrograph before and after the test of the sliding surface of the half bearing of the comparison example 2.

FIG. 11A is a micrograph before and after a test of the sliding surface of a half bearing of a comparison example 3.

FIG. 11B is a micrograph before and after the test of the sliding surface of the half bearing of the comparison example 3.

FIG. 12A is a micrograph before and after a test of the sliding surface of a plain bearing of the embodiment 1.

FIG. 12B is a micrograph before and after the test of the sliding surface of the plain bearing of the embodiment 1.

FIG. 13A is a micrograph before and after a test of the sliding surface of a plain bearing of the embodiment 2.

FIG. 13B is a micrograph before and after the test of the sliding surface of the plain bearing of the embodiment 2.

FIG. 14A is a micrograph before and after a test of the sliding surface of a plain bearing of the embodiment 3.

FIG. 14B is a micrograph before and after the test of the sliding surface of the plain bearing of the embodiment 3.

FIG. 15A is a micrograph before and after a test of the sliding surface of a plain bearing of the comparison example 1.

FIG. 15B is a micrograph before and after the test of the sliding surface of the plain bearing of the comparison example 1.

FIG. 16A is a micrograph before and after a test of the sliding surface of a plain bearing of the comparison example 2.

FIG. 16B is a micrograph before and after the test of the sliding surface of the plain bearing of the comparison example 2.

FIG. 17A is a micrograph before and after a test of the sliding surface of a plain bearing of the comparison example 3.

FIG. 17B is a micrograph before and after the test of the sliding surface of the plain bearing of the comparison example 3.

EMBODIMENT FOR CARRYING OUT THE INVENTION

In a sliding member according to any of the embodiments, on a surface of a sliding layer for slidably supporting a body to be slid, a sliding surface is formed. The sliding surface has an uneven configuration with arithmetic mean roughness (Ra) of 1.0 μm through 2.5 μm, 10-point average roughness (Rz) of 5.0 μm through 10.0 μm, and surface hardness (Hv) of 220 through 250.

In the sliding member according to any of the embodiments, the sliding layer is formed by metal material with a single composition, alloy materials with a predetermined composition, porous alloy materials into which plastic materials are impregnated, or the like. By performing the shot blasting on the surface of the sliding layer, oil reservoir is formed so that a sliding surface having a desired surface roughness that can improve slidability is formed. Further, by performing the shot blasting on the surface of the sliding layer, the surface hardness of the sliding layer rises so that the sliding surface having a desired surface hardness that is required under the circumstance to which heavy load is applied is formed.

Blasting material composed of steel-based metallic material, which has an almost spherical shape, with a particle size of 180 μm through 300 μm and surface hardness (Hv) of 280 through 600 is used in the shot blasting. The shot blasting is performed by blasting the above-mentioned blasting material onto the surface of the sliding layer at a blasting distance of not less than 50 mm and not more than 150 mm for a period of blasting time of not less than 5 seconds and not more than 30 seconds.

In any of the embodiments, by performing the shot blasting on the sliding layer made of existing copper alloy, for example, Cu—Sn alloy, having the surface hardness (Hv) of about 80 through about 150, under the above-mentioned conditions, the sliding surface having the above-mentioned desired surface roughness and surface hardness is formed.

The sliding member according to any of the embodiments has an effect of inhibiting alloy from being eroded or being hard to be fatigued because the shot blasting allows the sliding layer to have a higher hardness property so that it is excellent in cavitation erosion resistance property in a field of an oil machine. Particularly, it is preferably applied to an oil pump or the like. FIG. 1 is a diagram showing a configuration example of a piston pump as an example of the oil machine to which a sliding member according to any of the embodiments is applied. FIG. 1 is also a schematically side sectional view of the piston pump.

The piston pump 1 is configured so that a cylinder block 2 is attached to a case 3 while being supported by an input axis 20 and the cylinder block 2 rotates based on any driving force transmitted to the input axis 20. Plural cylinders 21 are formed along a rotation direction and a piston 4 is fit into each cylinder 21 so as to be insertable thereto.

In the piston pump 1, a plain bearing 5 for rotatably supporting the cylinder block 2 is installed. The plain bearing 5 is provided with an inlet port 50 and a discharge port 51, which are opened along the rotation direction of the cylinder block 2. It is installed between the cylinder block 2 and the case 3 while the inlet port 50 is communicated with an inlet 30 provided on the case 3 and the discharge port 51 is communicated with a discharge orifice 31 of the case 3. The sliding member according to any of the embodiments is applied to the plain bearing 5. Since the cylinder block 2 as a body to be slid rotates while being pushed toward an axis direction, the cylinder block 2 and the plain bearing 5 are relatively slid.

The piston pump 1 is also provided with a swash plate 6 for allowing the pistons 4 to be inserted into the cylinders 21 of the cylinder block 2 together with the rotation of the cylinder block 2, a yoke 60 for changing an angle of the swash plate 6, a manipulation piston 7 for allowing the swash plate 6 and the yoke 60 to be operated, and a return spring 8.

The piston pump 1 is configured so that the cylinder 21 from which the piston 4 is projected over the cylinder block 2 sucks oil and the cylinder 21 into which the piston 4 is inserted discharges the oil, together with the rotation of the cylinder block 2. The piston pump 1 is also configured so that by changing an angle of the swash plate 6 and the yoke 60, a stroke of any of the pistons 4 alters and an amount of discharged oil is adjustable.

In the piston pump 1, the case 3 is provided with a half bearing 9 for swingably supporting the swash plate 6 and the yoke 60. The sliding member according to any of the embodiments is applied to the half bearing 9 and the axis portion 61 of the yoke 60 as a body to be slid swings while being pushed toward a circumferential direction so that the axis 61 and the half bearing 9 are relatively swung.

When the piston pump 1 is configured so that the cylinder block 2 rotates in one direction, it is configured so that the inlet side of the oil and the discharge side thereof are fixed but when it is configured so that the cylinder block 2 rotates in both of forward and reverse directions, it is configured so that the Inlet side of the oil and the discharge side thereof are changed. While heavy load is applied to the plain bearing 5 by pushing the cylinder block 2 to the axis direction, the cylinder block 2 slides on one direction along the circumferential direction or both of the forward and reverse directions along the same. This allows the cylinder block 2 and the plain bearing 5 to slide in a circumferential direction while heavy load is applied thereto.

Further, in the piston pump 1, it is configured so that by swinging the swash plate 6 and the yoke 60 in both of the forward and reverse directions, an amount of discharged oil alters. While heavy load is applied to the half bearing 9 by pushing the axis portion 61 of the yoke 60 to the circumferential direction, the axis portion 61 slides in both of the forward and reverse directions along the circumferential direction. This allows the axis portion 61 and the half bearing 9 to slide in a linear direction under a condition in which heavy load is applied thereto.

EMBODIMENTS (1) Form of the Sliding Surfaces with or without the Shot Blasting

The shot blasting was performed on the sliding layers made of the alloy materials shown in the following Table 1 under the above-mentioned conditions and a form and surface hardness of the produced sliding surfaces of the embodiments 1 through 3, which were produced by performing the shot blasting thereon, were compared with those of the sliding surfaces of the comparison examples 1 through 3, which were produced by performing no shot blasting thereon.

TABLE 1

|  | Alloy Composition | Surface Hardness Hv(0.1) |
| --- | --- | --- |
| Embodiment 1 | Cu—Sn | 229 |
| Embodiment 2 | Cu—Sn—Bi | 231 |
| Embodiment 3 | Cu—Sn—Pb | 236 |
| Comparison Example 1 | Cu—Sn | 118 |
| Comparison Example 2 | Cu—Sn—Bi | 116 |
| Comparison Example 3 | Cu—Sn—Pb | 114 |

FIGS. 2A, 2B, and 2C are graphs each showing a form of surface roughness of the sliding surface in each embodiment. Here, FIGS. 2A, 2B and 2C show forms of the surface roughness of the sliding surfaces based on Japanese Industrial Standard (JIS) B0601 (1994). FIG. 2A shows a form of surface roughness of the sliding surface having the alloy composition of the embodiment 1, on which the shot blasting is performed. FIG. 2B shows a form of surface roughness of the sliding surface having the alloy composition of the embodiment 2, on which the shot blasting is performed. FIG. 2C shows a form of surface roughness of the sliding surface having the alloy composition of the embodiment 3, on which the shot blasting is performed.

FIGS. 3A, 3B, and 3C are graphs each showing a form of surface roughness of the sliding surface in each comparison example. Here, FIGS. 3A, 3B and 3C show forms of the surface roughness of the sliding surfaces based on Japanese Industrial Standard (JIS) B0601 (1994). FIG. 3A shows a form of surface roughness of the sliding surface having the alloy composition of the comparison example 1, on which no shot blasting is performed. FIG. 3B shows a form of surface roughness of the sliding surface having the alloy composition of the comparison example 2, on which no shot blasting is performed. FIG. 3C shows a form of surface roughness of the sliding surface having the alloy composition of the comparison example 3, on which no shot blasting is performed.

FIGS. 4A, 4B, and 4C are micrographs of the sliding surfaces in respective embodiments. Here, FIG. 4A is a micrograph of the sliding surface having the alloy composition of the embodiment 1, on which the shot blasting is performed. FIG. 4B is a micrograph of the sliding surface having the alloy composition of the embodiment 2, on which the shot blasting is performed. FIG. 4C is a micrograph of the sliding surface having the alloy composition of the embodiment 3, on which the shot blasting is performed.

FIGS. 5A, 5B, and 5C are micrographs of the sliding surfaces in respective comparison examples. Here, FIG. 5A is a micrograph of the sliding surface having the alloy composition of the comparison example 1, on which no shot blasting is performed. FIG. 5B is a micrograph of the sliding surface having the alloy composition of the comparison example 2, on which no shot blasting is performed. FIG. 5C is a micrograph of the sliding surface having the alloy composition of the comparison example 3, on which no shot blasting is performed.

As shown in FIGS. 2A, 2B and 2C as well as FIGS. 4A, 4B and 4C, in respective embodiments, by performing the shot blasting on the sliding layer 11, the sliding surface had an uneven configuration. In the embodiment 1 in which the alloy composition is Cu—Sn, arithmetic mean roughness (Ra) was 2.299 μm, 10-point average roughness (Rz) was 8.739 μm, and average spacing in roughness (Sm) was 0.3114 mm. Further, the surface hardness (Hv) was 229 as shown in the Table 1.

In the embodiment 2 in which the alloy composition is Cu—Sn—Bi, arithmetic mean roughness (Ra) was 2.344 μm, 10-point average roughness (Rz) was 8.286 μm, and average spacing in roughness (Sm) was 0.2244 mm. Further, the surface hardness (Hv) was 231.

In the embodiment 3 in which the alloy composition is Cu—Sn—Pb, arithmetic mean roughness (Ra) was 1.821 μm, 10-point average roughness (Rz) was 7.071 μm, and average spacing in roughness (Sm) was 0.2067 mm. Further, the surface hardness (Hv) was 236.

On the other hand, as shown in FIGS. 3A, 3B and 3C as well as FIGS. 5A, 5B and 5C, in respective comparison examples, by performing no shot blasting on the sliding layer 101, the sliding surface 100 had a flat configuration. In the comparison example 1 in which the alloy composition is Cu—Sn, arithmetic mean roughness (Ra) was 1.198 μm, 10-point average roughness (Rz) was 7.976 μm, and average spacing in roughness (Sm) was 0.2378 mm. Further, the surface hardness (Hv) was 118 as shown in the Table 1.

In the comparison example 2 in which the alloy composition is Cu—Sn—Bi, arithmetic mean roughness (Ra) was 0.9313 μm, 10-point average roughness (Rz) was 8.091 μm, and average spacing in roughness (Sm) was 0.3547 mm. Further, the surface hardness (Hv) was 116.

In the comparison example 3 in which the alloy composition is Cu—Sn—Pb, arithmetic mean roughness (Ra) was 0.5784 µm, 10-point average roughness (Rz) was 4.074 µm, and average spacing in roughness (Sm) was 0.2732 mm. Further, the surface hardness (Hv) was 114.

Based on the above results, it has been understood that in the respective embodiments on which the shot blasting was performed, any roughness is formed on both of upper and lower sides with respect to a center line O about the roughness. On the other hand, it has been understood that in the respective comparison examples on which no shot blasting was performed, they have surface configuration in which there is almost no protrusion above the center line O about the roughness. Further, it has been understood that when performing the shot blasting thereon, the surface hardness is improved about twofold as compared with a case in which no shot blasting is performed thereon.

(2) Relationship on Durability with or without the Shot Blasting

Tests for verifying any influence such as adhesion, abrasion and/or erosion, in which difference in the above-mentioned surface configuration exerted durability, were carried out using the piston pump 1 shown in FIG. 1. As the sliding member to be tested, the plain bearings 5 and the half bearings 9 having the sliding surfaces 10 according to the above mentioned embodiments 1 through 3 were manufactured by performing the shot blasting thereon and the plain bearings 5 and the half bearings 9 having the sliding surfaces 100 according to the above-mentioned comparison examples 1 through 3 were manufactured by performing no shot blasting thereon. Test conditions were as follows:

Cut-Off Durability Test
Discharging Power; 0 through 28 MPa
Cycles; 30,000 cycles (ON: 1 sec, OFF: 1 sec)
Oil temperature; 60 degrees C.
Number of Revolutions of Axis; N=1800 rpm.

FIGS. 6A, 6B, 7A, 7B, 8A, and 8B are micrographs before and after the test of the sliding surfaces of the half bearings of the respective embodiments. Here, FIG. 6A is a micrograph before the test of the sliding surface of the half bearing having the alloy composition of the above-mentioned embodiment 1, on which the shot blasting is performed. FIG. 6B is a micrograph after the test of the sliding surface of the half bearing having the alloy composition of the embodiment 1, on which the shot blasting is performed.

FIG. 7A is a micrograph before the test of the sliding surface of the half bearing having the alloy composition of the above-mentioned embodiment 2, on which the shot blasting is performed. FIG. 7B is a micrograph after the test of the sliding surface of the half bearing having the alloy composition of the embodiment 2, on which the shot blasting is performed.

FIG. 8A is a micrograph before the test of the sliding surface of the half bearing having the alloy composition of the above-mentioned embodiment 3, on which the shot blasting is performed. FIG. 8B is a micrograph after the test of the sliding surface of the half bearing having the alloy composition of the embodiment 3, on which the shot blasting is performed.

FIGS. 9A, 9B, 10A, 10B, 11A, and 11B are micrographs before and after the test of the sliding surfaces of the half bearings of the respective comparison examples. Here, FIG. 9A is a micrograph before the test of the sliding surface of the half bearing having the alloy composition of the above-mentioned comparison example 1, on which no shot blasting is performed. FIG. 9B is a micrograph after the test of the sliding surface of the half bearing having the alloy composition of the comparison example 1, on which no shot blasting is performed.

FIG. 10A is a micrograph before the test of the sliding surface of the half bearing having the alloy composition of the above-mentioned comparison example 2, on which no shot blasting is performed. FIG. 10B is a micrograph after the test of the sliding surface of the half bearing having the alloy composition of the comparison example 2, on which no shot blasting is performed.

FIG. 11A is a micrograph before the test of the sliding surface of the half bearing having the alloy composition of the above-mentioned comparison example 3, on which no shot blasting is performed. FIG. 11B is a micrograph after the test of the sliding surface of the half bearing having the alloy composition of the comparison example 3, on which no shot blasting is performed.

As shown in FIGS. 6A and 6B, in the half bearing 9 to which the sliding member according to the embodiment 1 is applied, an alloy component of which is Cu—Sn, the uneven configuration formed by the shot blasting on both of upper and lower sides with respect to a center line O about the roughness, as shown in FIG. 2A, becomes an oil reservoir on the sliding surface to act as any maintenance of oil film so that any evidence of adhesion has been not found on the sliding surface after the test, as shown in FIG. 6B.

Further, the surface hardness of the sliding surface is improved by the shot blasting so that the uneven configuration formed by the shot blasting on the sliding surface as shown in FIG. 6A has remained on the sliding surface after the test, as shown in FIG. 6B.

On the other hand, as shown in FIGS. 9A and 9B, in the half bearing 9 to which the sliding member of the comparison example 1 is applied, an alloy component of which is Cu—Sn, almost no protrusion has been discovered above the center line O about the roughness, as shown in FIG. 3A, so that an oil reservoir is not formed and the evidence of adhesion has been found on the sliding surface after the test as shown in FIG. 9B. The evidence of adhesion has been also found on the axis portion 61, which is a body to be slid, as shown in FIG. 1, in addition to the sliding surface side. This gathers any generation of heat at a sliding portion between the sliding surface and the body to be slid in which they are contacted to each other.

Here, the alloy composition of the embodiment 1 excludes Pb having a self-lubrication effect so that it has been understood that if the oil film is able to be suitably maintained under a boundary lubrication condition, a generation of adhesion could be inhibited without any addition of Pb.

As shown in FIGS. 7A and 7B, in the half bearing 9 to which the sliding member according to the embodiment 2 is applied, an alloy component of which is Cu—Sn—Bi, the uneven configuration formed by the shot blasting on both of upper and lower sides with respect to a center line O about the roughness, as shown in FIG. 2B, also becomes oil reservoir on the sliding surface to act as any maintenance of oil film so that any evidence of adhesion has been not found on the sliding surface after the test, as shown in FIG. 7B.

Further, the surface hardness of the sliding surface is improved by the shot blasting so that the uneven configuration formed by the shot blasting on the sliding surface as shown in FIG. 7A has remained on the sliding surface after the test, as shown in FIG. 7B.

On the other hand, as shown in FIGS. 10A and 10B, in the half bearing 9 to which the sliding member of the comparison example 2 is applied, an alloy component of which is Cu—Sn—Bi, protrusion has been almost not discovered above the center line O about the roughness, as shown in FIG. 3B, so that any oil reservoir is not formed and evidence of adhesion has been found on the sliding surface after the test as shown in FIG. 10B. The evidence of adhesion has been also found on the axis portion 61, which is a body to be slid, as shown in FIG. 1, in addition to the sliding surface side. This gathers any generation of heat at a sliding portion between the sliding surface and the body to be slid in which they are contacted to each other.

As shown in FIGS. 8A and 8B, in the half bearing 9 to which the sliding member according to the embodiment 3 is applied, an alloy component of which is Cu—Sn—Pb, the uneven configuration formed by the shot blasting on both of upper and lower sides with respect to a center line O about the roughness, as shown in FIG. 2C, also becomes an oil reservoir on the sliding surface to act as any maintenance of oil film so that any evidence of adhesion has not been found on the sliding surface after the test, as shown in FIG. 8B.

Further, the surface hardness of the sliding surface is improved by the shot blasting so that the uneven configuration formed by the shot blasting on the sliding surface as shown in FIG. 8A has remained on the sliding surface after the test, as shown in FIG. 8B.

On the other hand, as shown in FIGS. 11A and 11B, in the half bearing 9 to which the sliding member of the comparison example 3 is applied, an alloy component of which is Cu—Sn—Pb, almost no protrusion has been discovered above the center line O about the roughness, as shown in FIG. 3C, so that any oil reservoir is not formed and evidence of adhesion has been found on the sliding surface after the test as shown in FIG. 11B. The evidence of adhesion has been also found on the axis portion 61, which is a body to be slid, as shown in FIG. 1, in addition to the sliding surface side. This gathers any generation of heat at a sliding portion between the sliding surface and the body to be slid in which they are contacted to each other.

From the above, it has been found that the uneven configuration is formed on the sliding surface by the shot blasting in connection with the oil film formation under a boundary lubrication condition in the sliding members according to the respective embodiments and the surface hardness is improved to inhibit any adhesion and abrasion. It has been also found that if any one of the sliding members according to the respective embodiments is applied to the half bearing 9 of the piston pump 1 shown in FIG. 1, adhesion resistance property and abrasion resistance property are improved.

FIGS. 12A, 12B, 13A, 13B, 14A and 14B are micrographs before and after the test of the sliding surfaces of the plain bearing of the respective embodiments. Here, FIG. 12A is a micrograph before the test of the sliding surface of the plain bearing having the alloy composition of the above-mentioned embodiment 1, on which the shot blasting is performed. FIG. 12B is a micrograph after the test of the sliding surface of the plain bearing having the alloy composition of the embodiment 1, on which the shot blasting is performed.

FIG. 13A is a micrograph before the test of the sliding surface of the plain bearing having the alloy composition of the above-mentioned embodiment 2, on which the shot blasting is performed. FIG. 13B is a micrograph after the test of the sliding surface of the plain bearing having the alloy composition of the embodiment 2, on which the shot blasting is performed.

FIG. 14A is a micrograph before the test of the sliding surface of the plain bearing having the alloy composition of the above-mentioned embodiment 3, on which the shot blasting is performed. FIG. 14B is a micrograph after the test of the sliding surface of the plain bearing having the alloy composition of the embodiment 3, on which the shot blasting is performed.

FIGS. 15A, 15B, 16A, 16B, 17A and 17B are micrographs before and after the test of the sliding surfaces of the plain bearing of the respective comparison examples. Here, FIG. 15A is a micrograph before the test of the sliding surface of the plain bearing having the alloy composition of the above-mentioned comparison example 1, on which no shot blasting is performed. FIG. 15B is a micrograph after the test of the sliding surface of the plain bearing having the alloy composition of the comparison example 1, on which no shot blasting is performed.

FIG. 16A is a micrograph before the test of the sliding surface of the plain bearing having the alloy composition of the above-mentioned comparison example 2, on which no shot blasting is performed. FIG. 16B is a micrograph after the test of the sliding surface of the plain bearing having the alloy composition of the comparison example 2, on which no shot blasting is performed.

FIG. 17A is a micrograph before the test of the sliding surface of the plain bearing having the alloy composition of the above-mentioned comparison example 3, on which no shot blasting is performed. FIG. 17B is a micrograph after the test of the sliding surface of the plain bearing having the alloy composition of the comparison example 3, on which no shot blasting is performed.

As shown in FIGS. 12A and 12B, in the plain bearing 5 to which the sliding member according to the embodiment 1 is applied, an alloy component of which is Cu—Sn, the uneven configuration formed by the shot blasting on both of upper and lower sides with respect to a center line O about the roughness, as shown in FIG. 2A, also becomes oil reservoir on the sliding surface to act as any maintenance of oil film so that any erosion has been not found on the sliding surface around the discharge port 51 shown in FIG. 1 where a jet stream occurs even after the test, as shown in FIG. 12B.

Further, the surface hardness of the sliding surface is improved by the shot blasting so that the uneven configuration formed by the shot blasting on the sliding surface as shown in FIG. 12A has remained on the sliding surface after the test, as shown in FIG. 12B.

On the other hand, as shown in FIGS. 15A and 15B, in the plain bearing 5 to which the sliding member of the comparison example 1 is applied, an alloy component of which is Cu—Sn, protrusion has been almost not discovered above the center line O about the roughness, as shown in FIG. 3A, so that any oil reservoir is not formed and the erosion by the jet stream has been found on the sliding surface after the test as shown in FIG. 15B.

As shown in FIGS. 13A and 13B, in the plain bearing 5 to which the sliding member according to the embodiment 2 is applied, an alloy component of which is Cu—Sn—Bi, the uneven configuration formed by the shot blasting on both of the upper and lower sides with respect to a center line O about the roughness, as shown in FIG. 2B, also becomes an oil reservoir on the sliding surface to act as any maintenance of oil film so that any erosion has been not found on the sliding surface around the discharge port 51 shown in FIG. 1 where a jet stream occurs even after the test, as shown in FIG. 13B.

Further, the surface hardness of the sliding surface is improved by the shot blasting so that the uneven configuration formed by the shot blasting on the sliding surface as shown in FIG. 13A has remained on the sliding surface after the test, as shown in FIG. 13B.

On the other hand, as shown in FIGS. 16A and 16B, in the plain bearing 5 to which the sliding member of the comparison example 2 is applied, an alloy component of which is Cu—Sn—Bi, protrusion has been almost not discovered above the center line O about the roughness, as shown in FIG. 3B, so that any oil reservoir is not formed and the erosion by the jet stream has been found on the sliding surface after the test as shown in FIG. 16B.

As shown in FIGS. 14A and 14B, in the plain bearing 5 to which the sliding member according to the embodiment 3 is applied, an alloy component of which is Cu—Sn—Pb, the uneven configuration formed by the shot blasting on both of upper and lower sides with respect to a center line O about the roughness, as shown in FIG. 2C, also becomes oil reservoir on the sliding surface to act as any maintenance of oil film so that any erosion has been not found on the sliding surface around the discharge port 51 shown in FIG. 1 where a jet stream occurs even after the test, as shown in FIG. 14B.

Further, the surface hardness of the sliding surface is improved by the shot blasting so that the uneven configuration formed by the shot blasting on the sliding surface as shown in FIG. 14A has remained on the sliding surface after the test, as shown in FIG. 14B.

On the other hand, as shown in FIGS. 17A and 17B, in the plain bearing 5 to which the sliding member of the comparison example 3 is applied, an alloy component of which is Cu—Sn—Pb, protrusion has been almost not discovered above the center line O about the roughness, as shown in FIG. 3B, so that any oil reservoir is not formed and the erosion by the jet stream has been found on the sliding surface after the test as shown in FIG. 17B.

From the above, it has been found that the uneven configuration is formed on the sliding surface by the shot blasting in connection with the oil film formation under a boundary lubrication condition in the sliding members according to the respective embodiments and the surface hardness is improved to inhibit any erosion by the jet stream. It has been also found that if any one of the sliding members according to the respective embodiments is applied to the plain bearing 5 of the piston pump 1 shown in FIG. 1, erosion resistance property and abrasion resistance property are improved.

INDUSTRIAL APPLICABILITY

The sliding member according to the invention is indicative of adhesion resistance property, erosion resistance property and abrasion resistance property even under the boundary lubrication condition so that it is preferably applied to a bearing of an oil machine, to which heavy load is applied.

What is claimed is:

1. A sliding member comprising:
 a sliding surface formed on a surface of a sliding layer which is impact-hardened by a shot-blasting treatment, wherein the surface of the sliding surface has an uneven shape to form an oil reservoir, wherein the sliding surface exhibits arithmetic mean roughness (Ra) in the range of 1.0 μm through 2.5 μm, 10-point average roughness (Rz) in the range of 5.0 μm through 10.0 μm and surface hardness (Hv) in the range of 220 through 250, and the sliding surface slidably supports a body to be slid, and wherein the sliding layer is composed of a copper alloy having a surface hardness (Hv) of 80 through 150 before the shot-blasting treatment.

2. The sliding member according to claim 1 wherein the shot blasting has been performed using blasting material which comprises steel-based metallic material, the blasting material comprising particles having a spherical shape with a particle size in the range of 180 μm through 300 μm and surface hardness (Hv) in the range of 280 through 600.

3. The sliding member according to claim 1 wherein the shot blasting includes using a blasting distance of not less than 50 mm and not more than 150 mm for a period of blasting time of not less than 5 seconds and not more than 30 seconds.

\* \* \* \* \*